(12) United States Patent
Chakraborty et al.

(10) Patent No.: US 6,462,754 B1
(45) Date of Patent: Oct. 8, 2002

(54) METHOD AND APPARATUS FOR AUTHORING AND LINKING VIDEO DOCUMENTS

(75) Inventors: Amit Chakraborty, Cranbury; Peiya Liu, E. Brunswick; Liang Hsu, Robbinsville, all of NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/255,090

(22) Filed: Feb. 22, 1999

(51) Int. Cl.[7] .............................................. G06F 3/00
(52) U.S. Cl. ........................................ 345/723; 345/716
(58) Field of Search ................................. 345/327, 328, 345/339, 302, 357, 356, 716, 723, 764, 853, 854; 308/2, 7, 8, 10; 217/501, 502, 512; 386/96, 52, 104, 4

(56) References Cited

U.S. PATENT DOCUMENTS 5,835,667 A * 11/1998 Wactlar et al. .............. 348/552
6,084,589 A * 7/2000 Shima ......................... 345/419
6,219,048 B1 * 4/2001 Miller et al. ................. 345/339
6,225,993 B1 * 5/2001 Linblad et al. .............. 345/327

* cited by examiner

*Primary Examiner*—Cao H Nguyen
(74) *Attorney, Agent, or Firm*—Adel A. Abmed (57) ABSTRACT

A method for authoring video documents includes the steps of inputting video data to be processed, segmenting the video data into shots by identifying breaks between the shots, subdividing the shots into subshots using motion analysis to provide location information for motions of objects of interest, describing boundaries for the objects of interest in the video data such that the objects of interest are represented by the boundaries in the shots and creating an anchorable information unit file based on the boundaries of the objects of interest such that objects of interest are used to identify portions of the video data. A system is also included.

32 Claims, 4 Drawing Sheets

METHOD AND APPARATUS FOR AUTHORING AND LINKING VIDEO DOCUMENTS

BACKGROUND

1. Technical Field

This disclosure relates to authoring, extracting and linking video objects and more particularly, to authoring video by defining objects of interest in the video.

2. Description of the Related Art

Multimedia information is often very complex, drawing on a number of sources and containing large amounts of data. To make the multimedia information usable, it is preferable to create relevant and appropriate subject matter by employing all of the sources available, for example, through the use of hyperlinks. This provides the user a way to navigate a multimedia document based on present needs. Thus, the user has the capability to extract and visualize relevant information without actually having to look at all the information present. This is especially useful for videos which have become very popular and are being generated at an ever increasing rate by a variety of sources such as defense/civilian satellites, scientific experiments, biomedical imaging, industrial inspections, home entertainment systems etc. Typically, in these applications, the use of video clips is needed along with other media forms like audio, text, images etc. For example, for an electronic manual, while describing the characteristics of a machine part, it may be appropriate to permit the user to view a video clip of a relevant subpart. In that clip, the subpart may be highlighted, which if clicked on takes the user either to some other relevant source of information or back to the original text.

It would be advantageous to create links between an object that is visible for a certain duration in the video and other related information. Also, the duration of a video clip might have several linked objects existing either simultaneously or in different time windows linking to different destinations based on the content. To be able to use this information in a meaningful way in conjunction with all the other media types, i.e. text, images, audio etc., it is important to segment and structure the video and to create appropriate links between objects in different sections of a video and pertinent information in other media forms.

In concept, this is related to that of hypertext. It offers users a path to follow based on the user's interest and the content of the video. Just like a web page, at any instance, several static and dynamic links can be available simultaneously within the video space. There is however, one crucial difference, unlike a web page, the link opportunities only exist in a fixed temporal window which disappears after the object of interest disappears, unless of course, the user stops the video player, rewinds and plays it again, in which case the link opportunities reappear. In other words, links in these cases have an extra dimension, that of time.

As mentioned above, the concept of hyperlinked video or hypervideo originated out of hyperlinked text or hypertext. Early work in this genre includes, for example, Storyspace, described in J. D. Bolter, *Writing Space: The Computer, Hypertext and the History of Writing*, Lawrence Earlbaum and Associates, Hillsdale, N.J. 1991, a hypertext writing environment from Eastgate Systems that employs a spatial metaphor in displaying links and nodes. Users create writing spaces, or containers for text and images, which are then linked to other writing spaces. The writing spaces form a hierarchical structure that users can visually manipulate and reorganize. Synthesis, described in C. Potts, et al. "Collaborative pre-writing with a video based group working memory", Tech-Report, Graphics Usability and Visualization Center, Georgia Institute of Technology, pp. 93–95, 1993, is a tool based on Storyspace and allows one to index and navigate analog video content associated with text in writing spaces. Synthesis may be used in the production of hypervideo in the design and prototyping stages. It provided an early demonstration for text to video linking. Video to video linking was first demonstrated in the hypermedia journal Elastic Charles, described in H. P. Brondmo et al. *Creating and Viewing the Elastic Charles—A Hypermedia Journal in Hypertext: State of the Art*, Intellect, Oxford, UK, 1991, developed at the Interactive Cinema Group of the MIT media laboratory. Micons or miniaturized movie loops briefly appear to indicate video links. This prototype relied on analog video and laser disc technology requiring two screens. Today, digital video allows much more sophistication.

In the interactive Kon-Tiki Museum, described in G. Liestol, "Aesthetic and rhetorical aspects of linking video in hypermedia", Proc. Hypertext-94, ACM Press, New York, pp. 217–223, 1994, there is continuous linking present from video to text and video to video via the exchange of basic qualities between the media types. Time dependence was added to text and spatial simultaneity to video.

Videobook, as described in R. Ogawa et al., "Design strategies for scenario-based hypermedia: description of its structure, dynamics and style", Proc. Hypertext-92, ACM Press, New York, pp. 71–80, 1992, demonstrated time based scenario-oriented hypermedia. Here, multimedia content was organized using a nodal representation and timer driven links were automatically activated to present the content, based on the time attributes. In L. Hardman et al., "The Amsterdam hypermedia model: Adding time and content to the dexter model", Communications of the ACM, 37:50–62, 1995, they used timing to explicitly state the source and destination contexts when links were followed. In M. C. Buchanen et al., "Specifying temporal behavior in hypermedia documents", Proc. Hypertext-92, ACM Press, New York, pages 71–80, 1992, the authors created hypermedia documents by manipulating temporal relationships among media elements at a high level, rather than as timings.

Vactive™ from Ephyx Technologies and HotVideo™ from International Business Machines allow a limited set of links so that upon user interaction, either another section of the same video or another video starts playing or a web browser is directed to a specified URL address. It allows for elementary tracking, thereby permitting one to track objects for simple motion where the object doesn't change shape. However, the user has to go through the video and then find out the start and the end frames for such a tracking, and if there is a mistake, the user has to redraw the outline. These systems do not provide any way to semi-automatically organize the video, and the links permitted for use are limited. Authoring of these links needs to be done manually. This limits the flexibility and usability of these systems.

While in concept there is a similarity between hypertext and hypervideo, in terms of actual realization, several of the ideas need to be reformulated to accommodate the dynamic scope of video. Thus, the links need to be both temporal as well as spatial. And the authoring needs to encode this information. Similar is the case for navigating these links. Therefore, a need exits for a system and method for simplifying authoring of a video for hyperlinking wherein the user is not required to go through the entire video in order to identify objects of interest. A further need exists for interpolating capability between the start and end frames of the locations of the objects of interest to give precise location information without excessive computational overhead. A still further need exists for a motion analysis method to further break up the shots into subshots and use automatic hyperlinking to link the video clips or the objects thereof to different parts of a document system.

SUMMARY OF THE INVENTION

A method for authoring video documents includes the steps of inputting video data to be processed, segmenting the video data into shots by identifying breaks between the shots, subdividing the shots into subshots using motion analysis to provide location information of objects of interest undergoing motion, describing boundaries for the objects of interest in the video data such that the objects of interest are represented by the boundaries in the shots and creating an anchorable information unit file based on the boundaries of the objects of interest such that objects of interest are used to identify portions of the video data.

In other methods of the present invention, the step of segmenting the video data may include the steps of defining time segments for the video data, computing metrics as time series data for the time segments, comparing the video data between the time segments and identifying abrupt and gradual changes between the time segments of the video data to define the shots. The step of subdividing the shots into subshots using a motion analysis may include the steps of estimating motion for objects of interest by computing optical flow, observing the motion of the objects of interest, computing an error between the estimated motion and the observed motion and if the error is above a threshold value, creating an extra node to further define the motion of the objects of interest. The motion analysis may include an affine transform. The step of describing boundaries for the objects of interest may include the steps of assigning object types to the objects of interest for each shot, the object types including vertices, interpolating corresponding vertices on object types between frames of shots to define one of a spline and a line such that the spline and the line define the motion of the objects of interest between the frames. The method may include the step of linking the objects of interest to other objects to provide an interactive video document. The step of linking the objects of interest to other objects to provide an interactive video document may include the step of providing automatic hyperlinking between the video document and the other documents. The automatic hyperlinking may be provided by a hyperlinker and may further include the step of providing link specifications processing, pattern matching, and link establishment between sources and destinations. The method may further include the step of providing keyframes for representing shots and subshots of the video data such that the keyframe representation is used to identify the objects of interest included in the shots and subshots. The video is preferably specified in a video AIU specification language which follows SGML syntax and may further include the step of defining syntax for the video specification.

Another method for authoring video documents includes the steps of providing capable of hyperlinking to objects included in a browser, interpolating boundaries of the object types between frames to define motions of the objects of interest and playing the video and displaying anchorable information units associated with the object types in the video to provide interactive objects of interest for linking the objects of interest with other media upon selection of one the of the objects of interest and objects of the other media.

In other methods, the other media may include one of audio, hypertext, stored information and video. The step of interpolating may include subdividing identified shots of the video into subshots using a motion analysis, the motion analysis may include the steps of estimating motion for the objects of interest by computing optical flow, observing the motion of the objects of interest, computing an error between the estimated motion and the observed motion and if the error is above a threshold value, creating an extra node to further define the motion of the objects of interest. The motion analysis may include an affine transform. The step of interpolating may include the steps of assigning object types to the objects of interest, the object types including vertices and interpolating corresponding vertices on object types between frames of shots of the video to define a spline such that the spline defines the motion of the objects of interest between the frames. The method may further include the step of linking the objects of interest to other objects to provide an interactive video document which preferably includes the step of providing automatic hyperlinking between the object of interest in the video and the objects of the other media. The automatic hyperlinking may be provided by a hyperlinker and may further include the step of providing link specifications processing, pattern matching, and link establishment between sources and destinations. The method may include the step of providing keyframes for representing shots and subshots of the video data such that the key frame representation is used to identify the objects of interest included in the shots and subshots. The video is preferably specified in a video AIU specification language which follows SGML syntax and may further include the step of defining syntax for the video specification.

A system for authoring and viewing videos includes a video editor for creating an anchorable information unit (AIU) file for objects of interest in a video, and a video device for playing the video, the video having the anchorable information unit file associated therewith, the AIU file including object types associated with objects of interest within the video. A browser is included for interacting with the objects of interest wherein playing the video and displaying the AIU associated with the video provides interactive objects of interest for linking the objects of interest with other media upon selection of one the of the objects of interest and objects of other media types, such as other videos, images, text documents, etc. The video editor includes means for interpolating vertices of the objects between frames to define motions of the objects of interest so that the objects of interest are tracked during video play. The video is preferably specified in a video AIU specification language which follows SGML syntax.

In other embodiments, the other media may include one of audio, hypertext, stored information and video. The means for interpolating may further include a processor for subdividing identified shots of the video into subshots using a motion analysis, the processor preferably including means for estimating motion for the objects of interest by computing optical flow, means for observing the motion of the objects of interest, means for computing an error between the estimated motion and the observed motion and if the error is above a threshold value, means for creating an extra node to further define the motion of the objects of interest. The motion analysis may include an affine transform. The means for interpolating further includes means for assigning object types to the objects of interest, the object types including vertices, the vertices between frames of shots of the video defining a spline such that the spline defines the motion of the objects of interest between the frames. In other words, each object is a type and the objects are defined by their vertices. The system preferably includes an automatic hyperlinker for automatically hyperlinking the objects of interest in the video and the objects of the other media. The automatic hyperlinker may provide link specifications processing, pattern matching, and link establishment between sources and destinations. The video device may include one of a disk player, a processor and a tape player. The system may further include an input device for selecting the objects of interest in the video. The browser preferably includes a processor. The system may further include a key frame for representing each shot; and subshots may be defined by boundary frames such that the shot and subshots are individually identifiable by the system. The keyframes may be employed for authoring video documents other than by viewing the entire video.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

This disclosure relates to authoring and linking video objects for video and related information. In accordance with the present invention, a video is broken up into several segments. A shot or take in video parlance refers to a contiguous recording of one or more video frames depicting a continuous action in time and space. During a shot, the camera might remain fixed or it might undergo one of the characteristic motions, i.e. panning, zooming, tilting or tracking. Segmenting a video into a sequence of shots in general is non-trivial, complicated by the large variety of transitions between shots made possible by the modern editing machines. It is relatively easy to identify shot transitions including primarily of visually abrupt changes or camera breaks. Such transitions, also called straight cuts are relatively easy to detect by examining frame to frame intensity changes at the pixel level. In many cases however, a transition between two shots is made in a gradual manner using special editing machines to achieve a visually pleasing effect. These types of gradual changes are also called optical cuts. There are several types of optical cuts, such as fade in, fade out, dissolve, wipe, flips, superimpose, blow-ups, move-ins, etc. Navigation or traversing through the scenes of a hypervideo is achieved via time-based links, i.e., opportunities of navigation that only exist for a short duration. Traditionally, links imply static associations always available to a reader, whereas opportunities imply a window of time or space when an association may be active. Such opportunities appear dynamically, based on the current scene's context and provide navigational pathways to related information. As in the case of traditional hypertext, several text or image based links may also be present in the case of a hyperlinked video. In fact, there may be video links as well. Also, these links can appear concurrently. Either the user makes use of one of these links and traverses them, or they become unavailable after the temporal window passes and the predetermined video sequence continues to play.

One may also have interpretative textual narrations appearing as explanatory textual narrations for a shot, which may or may not be user triggered, i.e. as the relevant shots are being played, for that duration, some associated text might just appear at some position on the screen, much like what is normally seen in a closed captioned TV recording. However, this may be triggered by a user as well, in which case details about a particular object are revealed by clicking on that object. Also, the links may be viewed as spatial-temporal opportunities. This is so because an object within the screen might move over time. However, since the object is the same, it is likely that the object link has the same destination. This is unlike a traditional hypertext link.

Advantageously, the present invention uses a scene change detection method that subdivides a video into several units or shots. This detects both, gradual and abrupt changes. Thus, the authoring of the video for hyperlinking is considerably simplified and the user is not required to go through the entire video to identify objects of interest. Instead, only keyframes need to be reviewed in a video browser and from that the video shots that need to be edited are identified.

The present invention includes a motion analysis method to break up the shots into subshots. After breaking up the shots, a spline interpolator is employed to interpolate between start and end frames of the locations of the objects of interest. This gives a precise location of information without excessive computational overhead. Objects of interest need not exist for the whole duration of a shot. The object information is stored using a video AIU (anchorable information units) specification language which preferably follows the SGML (Standard Generalized Markup Language) syntax. Links are also coded using a Link specification language (or grammar) which also follows the SGML syntax. Automatic hyperlinking is used to link the video clips or the objects thereof to different parts of a document system.

Creating and playing hyperlinked video may be achieved by an appropriate structuring of the video. In accordance with the present invention, an imposition of a rigorous content-based structure is provided and a way of specifying structure within a video document using SGML syntax is included. The results of a scene change detection strategy and motion analysis are employed to break up the video in a semi-automated way. This information is then organized as described above in shots and subshot. This is also used to identify the start and end frames of each shot or subshot. During the authoring process, the user has the option of identifying important structures, which are outlined at the start and end frames of each subsection or subshot. Once again, the user has the choice of either accurately outlining the boundaries or just giving a rough outline and then letting the system use its sophisticated boundary finding mechanism to find the actual boundary. For all the video frames that lie in between, based on the complexity, interpolation is done using curve fitting techniques such as linear, spline etc. Linking to other sections of the same or different video or to different other media forms is achieved using an automated hyperlinking technology. Thus of several links needed to be made, rather than painfully entering all of them manually, the user has the option of having them entered automatically. The encoding of all this information is preferably completed using an SGML structure. Capability for manually defining the links is provided as well. While being played back, the appropriate link may be activated.

Referring now in specific detail to the drawings, it should be understood that the elements shown in the FIGS. 1–6 may be implemented in various forms of hardware, software or combinations thereof. Preferably, these elements are implemented in software on one or more appropriately programmed general purpose digital computers having a processor and memory and input/output interfaces. Referring now in specific detail to the drawings in which like reference numerals identify similar or identical elements throughout the several views, and initially to FIG. 1, a flow/block diagram is shown for a method/system in accordance with the present invention. In block 10 video is input as either compressed or decompressed video. One aspect of the present invention is to be able to segment the video into meaningful continuous units or shots. In block 12, shot identification is performed. A large video is, in general, a concatenation of several shots and thus can be segmented as such by properly identifying the breaks in between the shots or segments. These breaks can either be short abrupt changes or it could be gradual changes extending over several frames. An integrated scene change detection method developed by the inventors is used wherein a variety of information is extracted from the video in the form of a time series which is then used in conjunction to indicate breaks in the video.

Figure 2:
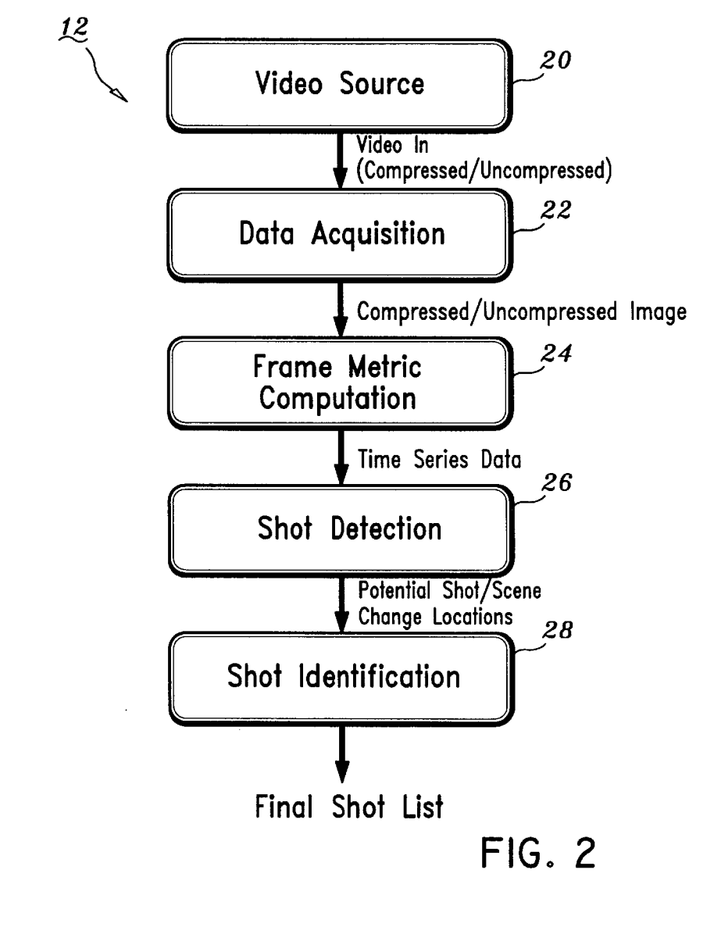
FIG. 2 is a flow/block diagram for detecting scene changes in video documents in accordance with the present invention.

Referring to FIG. 2, a flowchart for block 12 is described in greater detail. From block 20, input to the system may either be a compressed or a decompressed video. Depending upon the accuracy needed, it is decided what resolution, both in time and space, the algorithm needs to be executed. In block 22, data in from video source of block 20 is preprocessed by a data acquisition system to provide compressed and or uncompressed video images. In block 24, three different metrics are computed as a time series data for the time duration of the video. The three different metrics that are computed include interframe difference, an intensity histogram and an intensity variance of each one of these frames. Other metrics may be useful as well. The time series data is analyzed for a certain predetermined time window to detect scene changes. This is followed by a step in which validation as to whether or not the probable scenes (or shots) are actually independent shots in block 26. Once it is determined that they are shots, the locations of the start and end frames of each one of the shots are extracted and as a further validation step in block 28, each shot is checked to see if the neighboring keyframes are sufficiently different. Keyframes are frames designated as including pertinent or needed information which defines or represents a shot. If not, these shots are merged and a new keyframe is extracted which in turn is compared against its neighbors. Keyframes are representative of an entire shot. The process terminates when no changes remain and a final shot list ready for manual editing is obtained, if necessary. Thus, at the end of this process, the output is a shot list file that includes a list of the start, end and key frames of the different subsections of the different video subsections.

Referring again to FIG. 1, block 14 includes shot subdivision. Once the task of breaking up the video into global units has been achieved, block 14 is aimed at further subdividing the shots. This is preferred to create a very succinct description of the boundaries of the different objects of interest that might be linked to other sources of information. This eliminates the need to save boundary locations for all the frames for the different objects of interest. Instead, the boundary locations for each of the objects is saved at the start/end frames for each of the subshots (where the objects are visible) and then an interpolation model is stored. This not only saves memory space, but also makes the algorithm more efficient during playback, because the interpolation values may be easily computed once the boundary values and the interpolation model is known.

Figure 3:
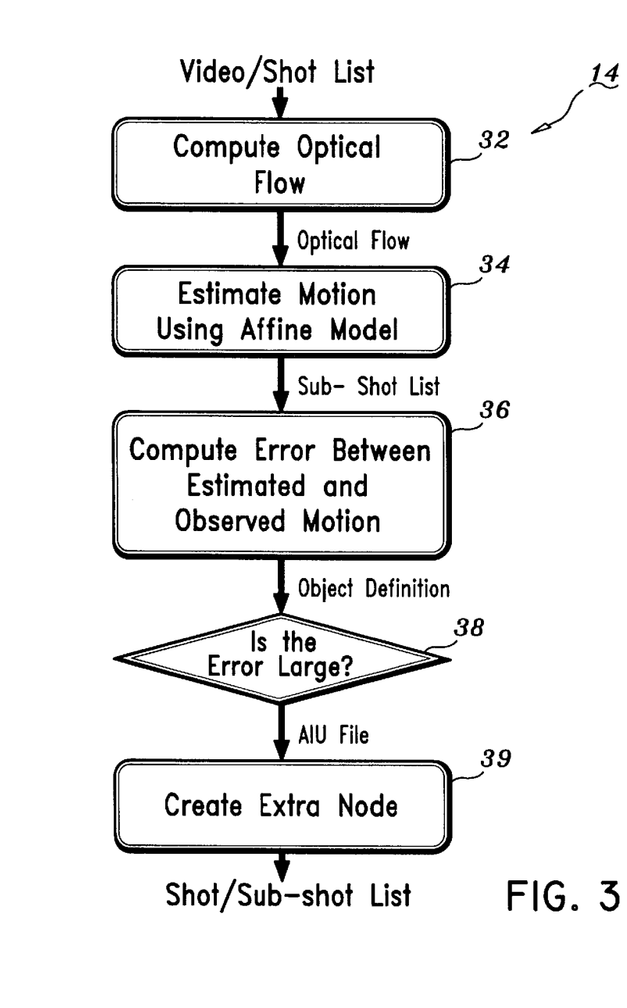
FIG. 3 is a flow/block diagram for shot subdivision in accordance with the present invention.

Referring to FIG. 3, block 14 is shown in greater detail. The interpolation values may be computed once the boundary values and the interpolation model is known which may be performed using motion analysis. In block 32, for each frame in the shot, an estimate of the local motion via computation of the optical flow is performed. This may be performed robustly using a multiscale approach. For example, the multiscale approach described in B. Lucas et al., "An iterative image registration technique with an application to stereo vision", Proc. Image Understanding Workshop, pp. 121–130, 1981, incorporated herein by reference may be used. For two consecutive frames, the motion at each point in the image may be described by:

$$I_t(x-V_x(x,y), y-V_y(x,y))=I_{t+1}(x,y) \qquad \text{(EQ. 1)}$$

the solution for the motion, $((V_x(x,y), V_y(x,y))^T$ is given as:

$$\begin{bmatrix} \sum I_{x2} & \sum I_x I_y \\ \sum I_x I_y & \sum I_y^2 \end{bmatrix} \begin{bmatrix} V_x \\ V_y \end{bmatrix} = \begin{bmatrix} -\sum I_x I_t \\ -\sum I_y I_t \end{bmatrix} \qquad \text{(EQ. 2)}$$

where $I_x$, $I_y$ and $I_t$ are the partial derivatives of the image intensity at (x, y) with respect to x, y (position) and t (time), respectively. The summations are taken over a small neighborhood around the point (x, y). A multiscale implementation allows for the estimation of large motions. Given this, an attempt to find how well the estimated motion may be approximated using an affine transformation in block 34. One hypothesis being that if an affine approximation is inadequate, it is likely that the interframe motion is large and thus it would be appropriate to introduce a node point to subdivide the shot at that instant in time. The shot or subshot includes a plurality of frames. The frames include a start frame and end frame and may further include intermediate frames. The motion of an object of interest between the start frame and the end frame may be defined by points or vertices of the object which have a position. As the objects move, their position changes. If the motion is such that further definition of the object of interest is needed, node points are added to the intermediate frames to further define this motion, for example by using a spline between points or vertices from start to end frames through node points in intermediate frames.

The affine parameters within a particular region are estimated using standard regression techniques. The regression may be applied separately on each velocity component as the x affine parameters depend only on the x component of the velocity and likewise for the y component. If it is assumed that the affine parameters are given by $a_x^T=[a_{x0}, a_{xx}, a_{xy}]$ and $a_y^T=[a_{y0}, a_{yx}, a_{yy}]$ and $\phi=[1, x, y]$ to be the regressor, then the motion field is given by:

$$V_x(x, y) = \phi^T a_x \text{ and } V_y(x, y) = \phi^T a_y \quad (EQ. 3)$$

and a linear least squares estimate of a for the motion is given by:

$$[a_x, a_y] = [\Sigma \phi \phi^T]^{-1} \Sigma (\phi [V_x(x, y) V_y(x, y)]) \quad (EQ. 4)$$

where the summation is applied within each region, then a distortion function is used, which may be given by:

$$G(x, y) = \sum_{x,y} (V(x, y) - (V_a(x, y))^2 \quad (EQ. 5)$$

where $V(x, y) = (V_x(x, y), V_y(x, y))^T$. In block 36, an error between the predicted and the observed motion is determined based on EQS. 3, 4 and 5. In block 38, if the error between the predicted and the observed motion is larger than a predefined threshold, it is concluded that the shot needs to be subdivided at this point and a node point needs to be inserted in block 39. Which may result in a keyframe being identified. If a shot needs no further subdivision, a keyframe exists which represents the shot, which is located in between the start and the end frame. A keyframe represents the whole shot and may be selected arbitrarily from among the frames, for example the middle frame. One note about this procedure is that rather than use all the points on the image, it is preferable to use only a selected number of points based on how appropriate they are for the computation of optical flow. It can be shown that a point can be tracked well if the symmetric 2×2 matrix on the left hand side of EQ. 1 is above the image noise level and is well conditioned. This means that the eigenvalues of the matrix should be large and the ratio between them should not be too far from 1.

Referring again to FIG. 1, block 16 includes defining boundaries for video objects. As mentioned before, boundaries are defined only on those shots that have structures that are of interest and which might later be hyperlinked. For those shots that have objects of interest, the user is guided through them and is prompted to outline the objects of interest for the start and end frame and the node frames computed using the motion analysis described above. In one embodiment, the user uses the same object type for outlining a particular object. Thus, if an object is outlined as an ellipse in the start frame, in all theother boundary frames and the end frame, it also has to be outlined as an ellipse, probably of a different size and at a different location. The different object types permitted may include a rectangle, an ellipse (circle) and/or a polygon.

Figure 1:
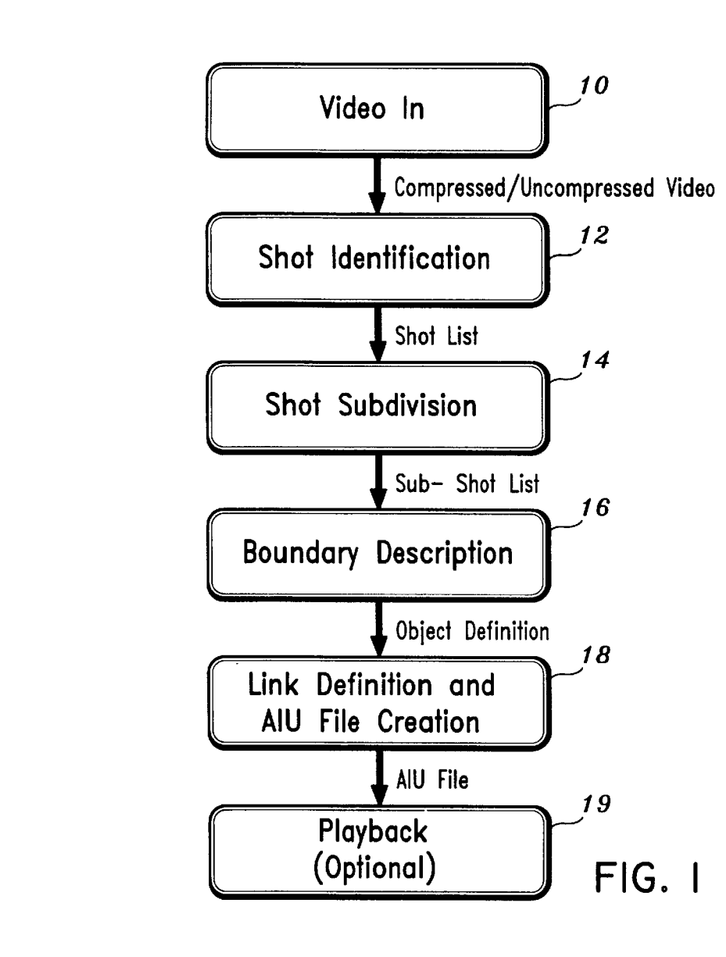
FIG. 1 is a flow/block diagram for a system/method for creating interactive video documents in accordance with the present invention.

There may be more than one object of interest in a single shot, i.e. there may be multiple objects on a single frame. However, it is not necessary that all of those objects extend over the whole time duration of the shot. These outlines are stored in an AIU file (as described below) where each entry corresponds to one particular object. Once the objects are outlined on the start, end and the intermediate boundary frames, interpolation is performed during run time preferably using a spline interpolation. An example of a spline interpolation is described in W. Press et al., *Numerical Recipes in C*, Cambridge University Press, 1995, incorporated herein by reference. If there are only two boundary frames (for example start and finish frames), then the spline interpolation reduces to be a linear interpolation. For a rectangle, the interpolation is performed on the coordinates of the diagonal points. For an ellipse (circle) this is done on the coordinates of a rectangle that defines a bounding box. For a polygon however, it is more complicated. The polygons are resampled to the same number of vertices. For simplicity, all coordinates used for interpolation will be described as vertices, i.e., diagonal points for rectangles, etc. Then the polygons are registered so that the exact correspondence between the vertices is known. Then the interpolation is performed on the coordinates of these vertices. This defines the polygons for all the frames that lie in between the ends of the spline/line which connects the polygons between frames (and shots).

In block 18, the structure of video documents is defined preferably in SGML (Standard Generalized Markup Language) to capture the information extracted from video. Other programming languages may be implemented as well. The objects that are extracted from the video are termed Anchorable Information Units (AIUs). A video document is thus represented as an instance of the Video AIU Document Type Definition (DTD). Since a video document is well-structured in SGML, automatic hyperlinking between video documents and all other types of documents may be performed in accordance with the present invention. This is performed so that when the user clicks on an object during playback, the appropriate link can be navigated to reach a correct destination. After processing, each video file is associated with an AIU file, which includes all the relevant information extracted from the video file. All multimedia documentation tools, such as a video player and a browser access, manipulate the video files through their corresponding AIU files.

The AIU file is defined in a hierarchical manner as follows. At the root of the AIU file, an AIUDoc definition exists which encompasses a header, footer and the extracted information within a VideoDocX field, as illustratively shown below.

```
<!ELEMENT AIUDoc - - (DocHeader, VideoDocX, DocFooter)>
<!ATTLIST     AIUDoc
              Id               CDATA      #IMPLIED
              Type             CDATA      #IMPLIED
              Name             CDATA      #IMPLIED
>
```
The definition of the DocHeader is given as:
```
<!ELEMENT DocHeader - - (DocType, DocDesc)>
<!ATTLIST     DocHeader
              Id               CDATA      #IMPLIED
              Type             CDATA      #IMPLIED
              Name             CDATA      #IMPLIED
              File             CDATA      #IMPLIED
>
```
and the fields in the VideoDocX are given by (these fields will be defined below)
```
<!ELEMENT VideoDocX - - ((VideoSeg | VideoAIU)*)>
<!ATTLIST     VideoDocX
              Id               CDATA      #IMPLIED
              Rate             CDATA      #IMPLIED
              Axis             CDATA      #IMPLIED
              DimSpec          CDATA      #IMPLIED
              SchedAttrName    CDATA      #IMPLIED
>
```
The VideoSeg field, which characterizes the scenes is defined as:
```
<!ELEMENT VideoSeg - - (VideoSeg2 | VideoAIU)*)>
<!ATTLIST     VideoSeg
              Id               CDATA      #IMPLIED
>
```
while the VideoSeg2 fields which are the segments in the present scene are defined by:
```
<!ELEMENT VideoSeg2 - - (VideoAIU*)>
<!ATTLIST     VideoSeg2
              Id               CDATA      #IMPLIED
              StartFrame       CDATA      #IMPLIED
              EndFrame         CDATA      #IMPLIED
              KeyFrame         CDATA      #IMPLIED
              SchedAttrName    CDATA      #IMPLIED
```

-continued

```
>
Finally, the AIUs may be defined using the following fields:
<!ELEMENT VideoAIU - - ((BoundaryList | Link)*)>
<!ATTLIST    VideoAIU
             Id              CDATA     #IMPLIED
             Type            CDATA     #IMPLIED
             Name            CDATA     #IMPLIED
             BoundaryFrames  CDATA     #IMPLIED
>
<!ELEMENT BoundaryList - - (Boundary*)>
<!ELEMENT Boundary - - ((#PCDATA)+)>
```

Thus an AIU file is a sequence of one or more parsable character data. Here, it is clearly a string of ASCII characters and numbers. For more details on the SGML syntax, refer to ISO. SGML, IS08879:1986 text and office systems—standard generalized markup language.

The Video AIUs listed above may include other attributes that are relevant for AIUs related to other media types. Further, the list of attributes illustratively shown in the code above may include other types of attributes or fewer types of attributes. As mentioned before, the video document is structured in a hierarchical manner. At the root is the entire video. This is then broken up into so called scenes which are then further divided into segments where segments includes a subset of frames of the set of frames of the scene. The AIU file starts with a description of the type of the underlying media type, which in this case is a video, other media, such as audio, text etc. may be used. The document header preferably includes four different fields including the underlying video file name, an unique identification (Id) for the whole video, a document type definition (DTD), which explains the context of the video and a more specific Document description explaining the content of the video. The information extracted from the video is preferably stored within the VideoDocX structure. The VideoDocX structure has a unique Id derived from the Id of the video file itself and includes the rate information as well as the basis on which the video is divided temporally, which may be, for example, a number representing a frame number.

The complete duration of the scene is given in the DimSpec field, which includes the start and end frame. The SchedAttrName mentions the attribute on which the scheduling is done which in the current case includes boundary frames. The video is organized in an hierarchical manner using scenes and segments. The segments have the following attributes. Once again, there is an unique Id for each segment. The start and end frames of these segments define the extent of these segments. Keyframe defines the representative frame of the segment. This is used for a quick viewing of the video. In other words the keyframe may be viewed to understand what the shot or scene is about. The VideoAIUs once again have an unique Id. The VideoAIUs are preferably of the following types: rectangle, ellipse and polygon. Other types are contemplated as well. Each AIU also has a unique name.

The BoundaryFrames field identifies which frames the coordinates of the underlying object of interest are defined. The BoundaryList defines the coordinates of the underlying object at each one of the BoundaryFrames. Thus, there are as many Boundary definitions within the BoundaryList definition as there are boundary frames. The Boundary defines the x and y coordinates of the underlying object on a boundary frame. In the case of rectangles and ellipses, only the upper left and lower right corners of the bounding box are defined. In the case of a polygon, all the nodes are defined. An illustrative example of a video AIU file is as follows. The link definition for this example is described below.

```
<AIUDoc Type="Video">
<DocHeader File="v942ovw.mjg" Id="Nv942ovw">
<DocType> Training </DocType>
<DocDesc> Overview of V94.2 Gas Turbine </DocDesc>
</DocHeader>
<VideoDocX Id="IDV942" Rate="15" Axis=
   "FrameNumber" DimSpec="1 1209" SchedAttrName=
   "BoundaryFrames">
<VideoSeg Id="SCENE1">
<VideoSeg2 Id="IDV942P1" StartFrame="66" KeyFrame=
   "180" EndFrame="261">
</VideoSeg2>
<VideoSeg2 Id="IDV942P2" StartFrame="270"
   KeyFrame="320
   " EndFrame="373">
</VideoSeg2>
</VideoSeg>
<VideoSeg Id="SCENE2">
<VideoSeg2 Id="IDV942P3" StartFrame="424"
   KeyFrame="430" EndFrame="444">
</VideoSeg2>
<VideoSeg2 Id="IDV942P4" StartFrame="620"
   KeyFrame="800" EndFrame="1209"> </VideoSeg2>
</VideoSeg>
<VideoAIU Id="VAIU01" Type="rectangle" Name=
   "180object1" BoundaryFrames="66 100 156 240">
<BoundaryList>
<Boundary> 254 161 370 270 </Boundary>
<Boundary> 224 145 336 255 </Boundary>
<Boundary> 201 130 315 241 </Boundary>
<Boundary> 160 99 275 205 </boundary>
</BoundaryList>
</VideoAIU>
<VideoAIU Id="VAIU02" Type="ellipse" Name=
   "180Object2" BoundaryFrames="100 156 240 261">
<BoundaryList>
<Boundary> 211 17 365 103 </Boundary>
<Boundary> 250 70 400 150 </Boundary>
<Boundary> 300 93 445 180 </Boundary>
<Boundary> 358 101 501 193 </Boundary>
</BoundaryList>
</VideoAIU>
<VideoAIU Id="VAIU03" Type="ellipse" Name=
   "320object1" BoundaryFrames="300 350">
<BoundaryList>
<Boundary> 65 139 171 245 </Boundary>
<Boundary> 42 180 145 290 </Boundary>
</BoundaryList>
</VideoAIU>
<VideoAIU Id="VAIU04" Type="ellipse" Name=
   "320Object2" BoundaryFrames="270 320 373">
<BoundaryList>
<Boundary> 444 140 553 243 </Boundary>
<Boundary> 400 160 520 220 </Boundary>
<Boundary> 320 191 450 258 </Boundary>
</BoundaryList>
</VideoAIU>
<VideoAIU Id="VAIU05" Name="polygon" Name=
   "430Object1" Boundaryframes="424 444">
<BoundaryList>
<Boundary> 438 81 411 88 397 102 383 138 406 185 480
   175 493 122 465 89 438 81 </Boundary>
<Boundary> 450 90 420 97 405 115 400 150 420 190 490
   188 501 131 480 95 450 90 </Boundary>
```

```
</BoundaryList>
</VideoAIU>
</VideoDocX>
<DocFooter> </DocFooter>
</AIUDoc>
```

The details of the video AIU file as set forth above are as follows:

The video file is named "v942ovw.mjg" as suggested by the File parameter. It is a training video and gives an overview of a Gas Turbine as given by the DocType and DocDesc parameters. It is a 15 frame/sec video as given by the Rate parameter and there are 1209 frames in it as given by the DimSpec parameter.

There are two Scenes in the video. Both the scenes consist of two shots. The first Scene, SCENE1 has two shots, the first of which start at 66 and end at 261 and the keyframe for this shot is at 180. The second shot starts at 270 and ends at 373 and the keyframe for this shot is at 320. The frames 262–269 between the two shots constitute a shot change.

Likewise, the second scene SCENE2 has two shots, one starting at 424 and ending at 444 with a keyframe at 430, and the other starting at 620, ending at 1209, with the keyframe being at 800.

There are five AIUs in this video. The first AIU is a rectangle object. It starts at frame 66 and ends at frame 240. It has 4 boundary (node) frames 66, 100, 156 and 240. At all of these node frames, the rectangle is defined. The rectangle changes shape between the frames. At frame 66, the top left (x, y) coordinate is given by (254, 161) and the bottom right by (370, 270). And similarly for the other 3 node frames. In the actual video it tracks the shape of the overview of an oven burner over the 174 frames.

The next AIU is an ellipse object and it tracks a ring which is a machine part from the frames 100 to 261. It again has 4 boundary (node) frames. The ellipse is defined by the bounding box and can thus be defined in a similar way as the rectangle. While displaying, the player of the video knows the shape and displays the appropriate one. The reason we need multiple node frames is that the underlying object changes position and shape, and this simple linear interpolation between the first (start) and the last frame will not be accurate. To understand this, consider the case of a sinusoidal function. To be able to approximately reconstruct the values between two points that are apart by more than half the time period (time period-time after which the function has equal values). We need to know the value at several points on the trajectory. Or take the instance of an object moving in a parabolic fashion, we cannot estimate the locations at the points in between just by knowing the end points (unless we know the model). Here, in our problem not only do the objects change location, they can actually change shape due to different viewing angles, for example.

The third AIU is an ellipse. It has only two boundary frames, the start and the end. In other words, the change is linear between them and thus we do not need more that 2 nodes.

The fourth AIU is again an ellipse that is a pipe opening for the Gas Burner and is described by 3 boundary frames, 270, 320 and 373. It actually changes shape (becomes smaller) and changes location as the camera moves away from it.

The final AIU demonstrates the capability to describe AIUs with arbitrary shapes. It is described using a polygon which have multiple vertices. In this case it spans between the frames 424 and 444 and is defined as given at those two frames only. In between, it is a case of simple interpolation. The last few lines in the AIU files are to define the closures.

The AIUs may or may not have links associated with them as described before. If there is a link, navigation is allowed on user interaction. In this example, the first, fourth and the fifth AIU have associated links. Thus if the user clicks on the displayed object while they are being displayed, the appropriate link is navigated, otherwise no action is taken.

Hyperlinking video documents is performed in block 18 of FIG. 1. Hyperlinking for the video AwUs may either be performed manually or in an automatic fashion. Manual links may be inserted during the AIU outlining phase described above. However, for the present invention, since the information extracted from video is stored in well-structured AIU files, an Automatic Hyperlinker has been developed by the inventors to automatically hyperlink video AIUs with all other types of documents based on Hyperlink Specifications. That is, a Hyperlinker processes link specifications, performs pattern matching on the contents and structures of the documents, and establishes links between sources and destinations.

One important aspect of the present invention is how the link information is encoded within the AIU files. Each one of the objects of interest encoded may potentially have a link. In one embodiment, an SGML structure is used for the AIU files and links are entities within that file, so Links are also defined using a similar SGML structure. The definition and the fields are illustratively given below:

```
<!ELEMENT Link - - ((#PCDATA)+)>
<!ATTLIST    Link
             LinkId        CDATA      #IMPLIED
             Type          CDATA      #IMPLIED
             SubType       CDATA      #IMPLIED
             Linkend       CDATA      #IMPLIED
             Book          CDATA      #IMPLIED
             Focus         CDATA      #IMPLIED
             LinkRuleId    CDATA      #IMPLIED
             ...
>
```

The Type defines the type of destination, i.e. if it is text or image or video, etc. Focus defines the text that is highlighted at the link destination. Book represents the book that the destination is part of. Since one application is a hyperlinked manual, these fields are organized in a hierarchical tree, where each manual is represented as a book. Linkend, one important attribute, includes the destination information. LinkId is an index to a database if the destination points to a database. LinkruleId indicates what rule created this link. Finally SubType is similar to the Type definition in the AIU specification above. Labels give a description of the link destination. There may be other optional attributes as well. When the link type is a "Jump", that means that the destination is another point in the same video, the location (i.e. the frame number) given by the content of the LinkId.

In the following, an illustrative example of the hyperlinked AIU file is shown in SGML code. That is, Link elements are manually or automatically added to VideoAIUs that are to be hyperlinked to their destinations during playback.

```
<AIUDoc Type="Video">
...
<VideoDocX Id="IDV942" Rate="15" Axis=
   "FrameNumber" DimSpec="1 1209" SchedAttrName=
   "BoundaryFrames" <VideoSeg Id="SCENE1">
```

```
...
<VideoSeg>
...
<VideoAIU Id="VAIU01" Type="rectangle" Name=
   "18 0objectI" BoundaryFrames="66 100 156 240">
...
<Link Type="Text" Subtype="ID" LinkId="7001"
   Linkend="N13509426" Book="31" Labels="Text Docu-
   ment in Vol 3.1">
</Link>
<VideoAIU>
...
<VideoAIU Id="VAIU04" Type="ellipse" Name=
   "320Object2" BoundaryFrames="270 320 373">
...
<Link Type="Text" Subtype="ID" LinkId="7002"
   Linkend="HL133" Book="31" Labels="Text Document
   in Vol 3.1">
</Link>
<VideoAIU>
<VideoAIU Id="VAIU04" Name="polygon" Name=
   "430object1" Boundaryframes="424 444">
<Link Type="Text" Subtype="ID" LinkId="7003"
   Linkend="HL233" Book="31" Labels="Text Document
   in Vol 3.1">
</Link>
<VideoAIU>
<VideoDocX>
<DocFooter> </DocFooter>
</AIUDoc>
```

Figure 4:
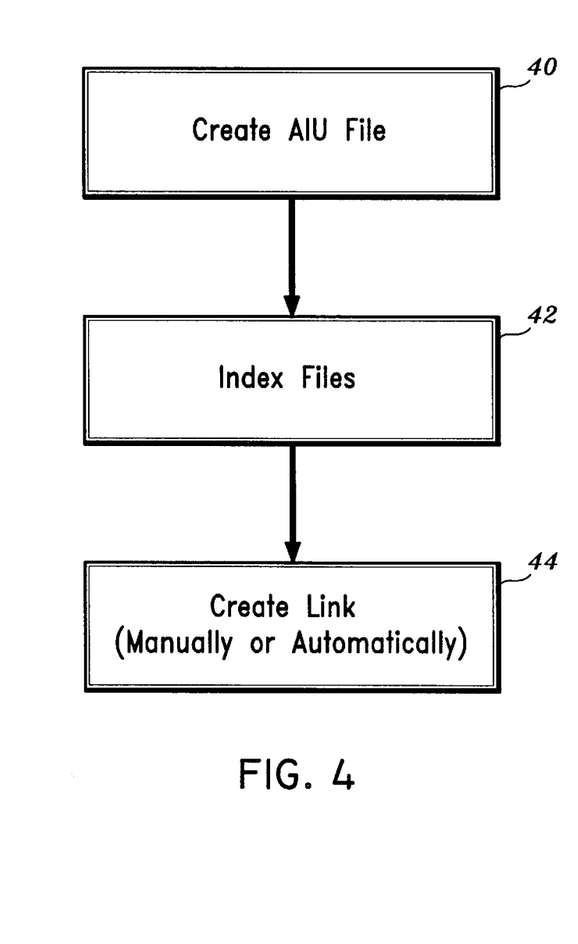
FIG. 4 is a flow/block diagram for manually/automatically hyperlinking in accordance with the present invention.

Referring to FIG. 4, block 18 of FIG. 1 is shown in more detail. In block 40 AIU files are created as described above. SGML documents (including the AIU files) are preindexed using an SGML Indexer in block 42. This includes a dictionary listing of every SGML element in the order they appear in the documentation and an index into that dictionary. Based on user-defined link specifications, links are created in block 44 using pattern matching on these dictionary files. For the Video AIUs, links are created to and from the Video AIUs in block 44. Details about a hyperlinker which may be used to perform hyperlinking is described in P. Liu, et al. "Towards automating the creation of hypermedia service manuals by compiling specifications", Proc. IEEE Multimedia, pages 203–212, 1994, incorporated herein by reference.

Advantageously, in accordance with the present invention, the hyperlinker may be used directly in the video AIU authoring system by structuring the Video information using the AIU specification language as explained above. This permits the use of hyperlink management systems which can incrementally update link rules. This is also performed by link manager software that uses a link database to keep track of link rule changes by using time stamps. Incremental hyperlinking may be performed either by changing existing link specifications or by adding some extra link specifications. When adding new link specifications, the hyperlinker executes the new link specification on all documents and adds new links without destroying the old ones. When a link becomes obsolete, based on the Id of the old link, the old links are removed. A similar procedure is adopted when adding new links.

Figure 5:
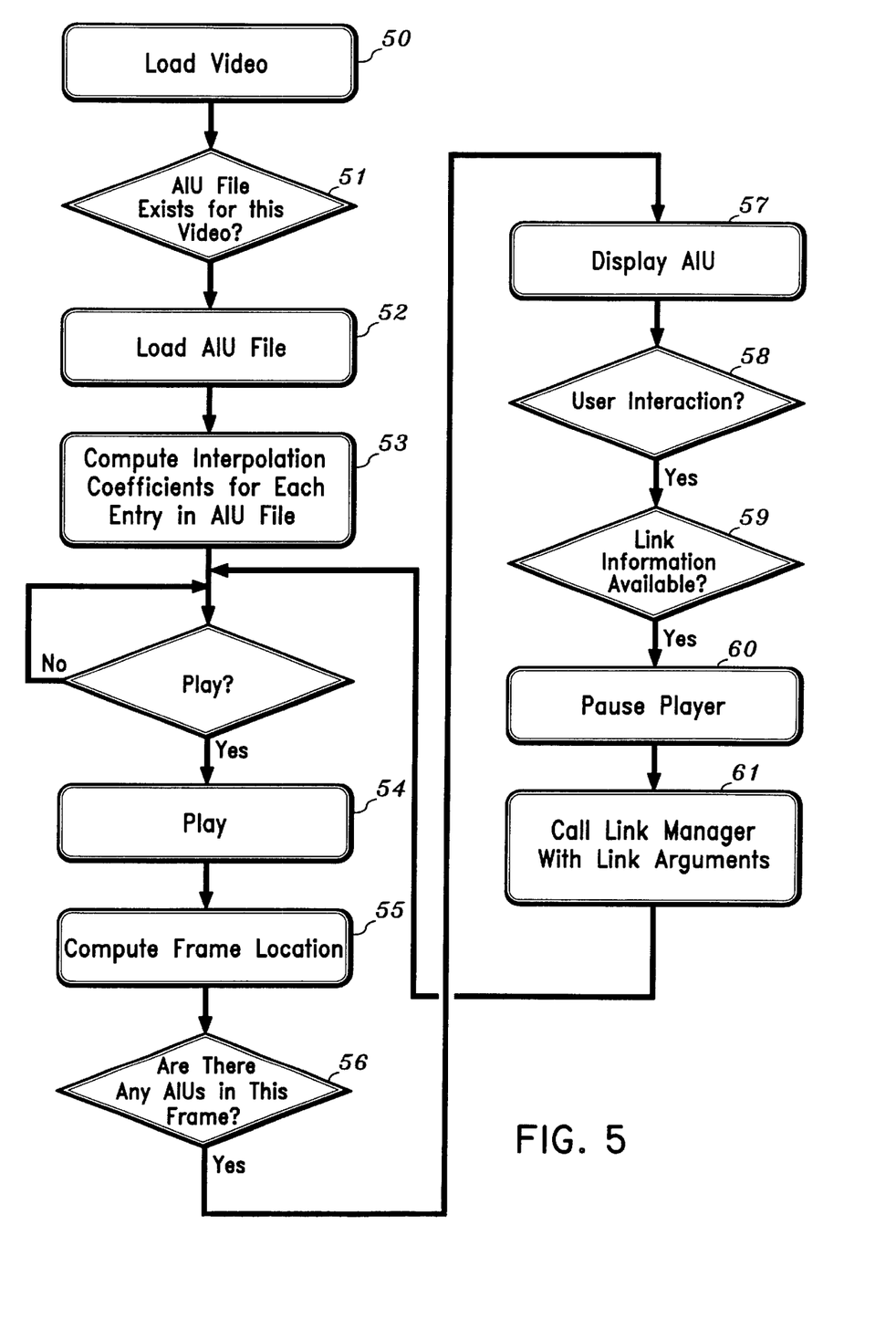
FIG. 5 is a flow/block diagram for a system/method for interacting with video documents in accordance with the present invention.

Referring again to FIG. 1, playback may optionally be performed in block 19. After the hyperlinking has been achieved, functionality may be tested during playback. In one embodiment, a normal video player is modified and uses special purpose software to achieve interprocess communication via the link manager. Referring now to FIG. 5, when a player, for example, is given a command to load a certain video in block 50, while loading it, player looks to see if an AIU file is available for that video in block 51. If so, it is also loaded along with the original file in block 52. In block 53, for each entry in the AIU file, the boundary files of the start, end and the keyframes are then loaded. Further, the interpolation coefficients are computed for Boundary Definition (associated with objects of interest in the video). Thus, during playback, the computationally demanding job of computing the interpolation coefficients does not need to be done since it may have already been performed. Play begins in block 54. During playback, at each frame, the frame is checked to see if the frame is part of one of the shots that has hyperlinked objects which needs to be highlighted. If this is the case then the corresponding shot is identified and then the boundaries of the different objects that need to be outlined are computed in block 55. These boundaries are then overlayed on the frame. In fact, to speed up the process a simple array of flags may be used that identify whether a frame has objects (AIUs) of interest in it or not in block 56. This information is encoded in the AIU file and displayed in block 57. Following this, if the user clicks on any of the objects in block 58, and the link information is available in block 59, the player may pause the video in block 60 to communicate with the link manager with the appropriate Link Id in block 61. The Link Manager then executes the link destination. Often within a multimedia documentation environment, this means jumping to a particular point of the text or showing a detailed image of the object in question. In that case, the SGML browser jumps to that point in the SGML document. In case it is a jump command, the player is instructed to jump to that location and that frame becomes visible. If the user chooses to continue to play again, then the player takes off from this location. If the command is not a jump, then the player continues to play from where it had paused. This continues until the video is over or until the user stops the player.

The present invention provide a own scene change detection method that subdivides a video into several units or shots. Advantageously, this detects both, gradual and abrupt changes. Thus the authoring of the video for hyperlinking is considerably simplified and the user is not required to go through the entire video to identify objects of interest. Instead, one has to only look at the keyframes in a video browser and from that identify which shots need to be edited. A motion analysis method is employed to further break up the shots into subshots. After breaking the subshot/ shots up, a spline or line interpolator is used to interpolate between the start and end frames for the locations of the objects of interest. This gives precise location information without too much computational overhead. An AIU specification language is used to store the object information using the video which follows the SGML syntax. Links are also coded using the Link specification language presented herein which also follows the SGML syntax. Automatic hyperlinking is provided to link the video clips or the objects thereof to different parts of a document system.

Figure 6:
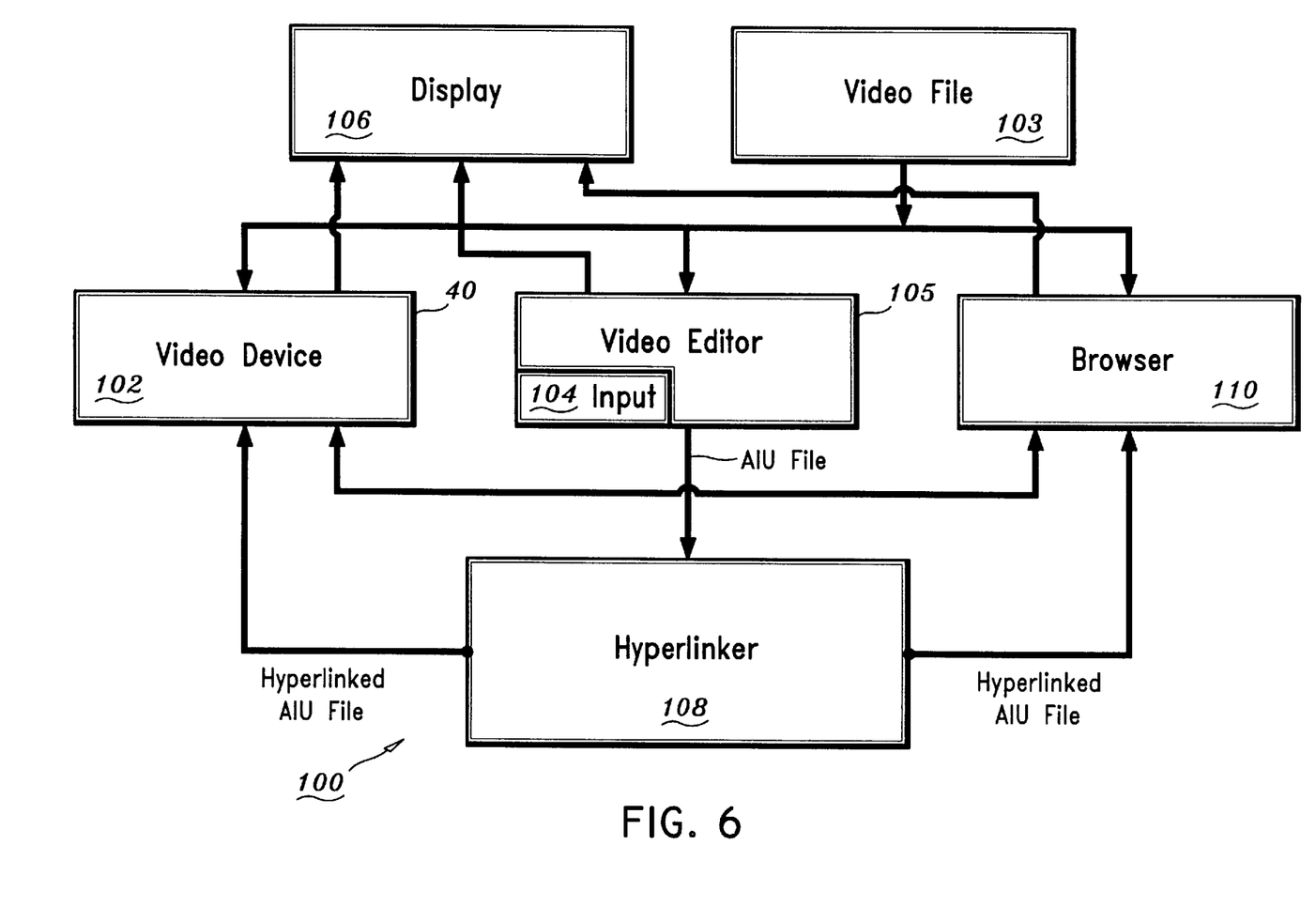
FIG. 6 is a block diagram for a system for interacting with video documents in accordance with the present invention.

Referring to FIG. 6, a system 100 for hyperlinked video playback and authoring a video in accordance with the present invention is shown. System 100 includes a video device 102 such as a video tape player, compact disk player, a personal computer or any other video playback device. An input device or input system 104 includes for example, a mouse keypad, touch screen or the like for "clicking on" or selecting objects of interest in a video played on video device and is included as a part of video editor 105 which is used for authoring the video in accordance with the invention. Video editor 105 may include a processor such as a personal computer. A display 106, for example a monitor, television, etc., is included for viewing the video.

System 100 may be employed for authoring interactive video files and/or playback of video files with hyperlinks. In one embodiment, all functions of system 100 may be performed on a single processor or computer. A video file 103 is input to video editor 105 for authoring in accordance with the invention. Video editor 105 outputs an AIU file. A hyperlinker 108 is included for creating links to objects of interest of video with the AIU file. Links may be to other documents such as hypertext, video clips, audio tracks, other media, etc. or to the same document. Hyperlinker 108 preferably links objects of interest in the video to other objects via the anchorable information unit file associated with the video, as described above. A browser 110 may be provided which may include a processor such as a personal computer. Browser 110 is used to interact with the video (and AIU file) and provides access to keyframes which represent whole shots to permit editing of shots, subshots etc. instead of having to review larger portions of the video. The hyperlinked AIU file can either be used by video player device 102 or by the combination of browser 110 and the video device or player 102. When used in combination, video browser 110, upon activation by a user, can request video device 102 to play only that particular shot or segment requested along with the corresponding AIU object(s). In this way, a video may be referenced and/or reviewed by a user without viewing the whole video. By breaking up the video, and identifying keyframes in accordance with the present invention, the video is effectively "summarized" making authoring of video documents easier and more user friendly. Instead of having to review an entire document, the present invention provides an operation to enable a user to hyperlink a video clip to a video manual, for example, or the capability to view only the shot or shots including the objects of interest on the display 106.

System 100 provides a way of making video clips easily accessible for use in linking objects. A key frame for a particular shot or subshot, can be employed to represent a video shot and may be used to manipulate the shot or scene in editing the video, creating a webpage, etc.

A specification language is employed by video editor 105 for authoring videos in accordance with the invention. The language (preferably SGML syntax) provides a content based structure which includes shots and subshots divided to describe the content of the video. Further, a grammar for link description is included to permit linking capabilities between the same video, other videos or different media. Keyframes are identified in video editor 105 to identify objects of interest more easily with video browser 110. This provides easier access to objects of interest which are to be hyperlinked without viewing the whole video. Video editor 105 further performs boundary identification, motion analysis (spline interpolation), etc. as described above. Advantageously, by selecting a keyframe or an object of interest with browser 110, the present invention permits viewing of the shot or subshot which includes the object(s) of interest without having to view the entire video to get to the content desired by the user.

Having described preferred embodiments for a method and system for authoring and linking video documents (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for authoring video documents comprising the steps of:

inputting video data to be processed;

segmenting the video data into shots by identifying breaks between the shots;

subdividing the shots into subshots using motion analysis to provide location information for motions of objects of interest;

describing boundaries for the objects of interest in the video data such that the objects of interest are represented by the boundaries in the shots; and creating an anchorable information unit file based on the boundaries of the objects of interest such that objects of interest are used to identify portions of the video data.

2. The method as recited in claim 1, wherein the step of segmenting the video data includes the steps of:

defining time segments for the video data computing metrics as time series data for the time segments;

comparing the video data between the time segments; and identifying abrupt and gradual changes between the time segments of the video data to define the shots.

3. The method as recited in claim 1, wherein the step of subdividing the shots into subshots using a motion analysis includes the steps of:

estimating motion for objects of interest by computing optical flow;

observing the motion of the objects of interest;

computing an error between the estimated motion and the observed motion; and if the error is above a threshold value, creating an extra node to further define the motion of the objects of interest.

4. The method as recited in claim 1, wherein the motion analysis includes an affine transform.

5. The method as recited in claim 1, wherein the step of describing boundaries for the objects of interest includes the steps of:

assigning object types to the objects of interest for each shot, the object types including vertices;

interpolating corresponding vertices on object types between frames of shots to define one of a spline and a line such that the spline and the line define the motion of the objects of interest between the frames.

6. The method as recited in claim 1, further comprises the step of linking the objects of interest to other objects to provide an interactive video document.

7. The method as recited in claim 6, wherein the step of linking the objects of interest to other objects to provide an interactive video document includes the step of providing automatic hyperlinking between the video document and the other objects.

8. The method as recited in claim 7, wherein the automatic hyperlinking is provided by a hyperlinker and further comprises the step of providing link specifications processing, pattern matching, and link establishment between sources and destinations.

9. The method as recited in claim 1, further comprises the step of providing keyframes for representing shots and subshots of the video data such that the keyframe representation is used to identify the objects of interest included in the shots and subshots.

10. The method as recited in claim 1, wherein the video is specified in a video AIU specification language which follows Standard Generalized Markup Language (SGML)

syntax and further comprising the step of defining syntax for the video specification.

11. A method for authoring video documents comprising the steps of:
   providing a video device for playing a video;
   associating the video with an anchorable information unit (AIU) file, the AIU file including object types associated with objects of interest within the video, the objects of interest being capable of hyperlinking to objects included in a browser;
   interpolating boundaries of the object types between frames to define motions of the objects of interest; and
   playing the video and displaying anchorable information units associated with the object types in the video to provide interactive objects of interest for linking the objects of interest with other media upon selection of one the of the objects of interest and objects of the other media.

12. The method as recited in claim 11, wherein the other media includes one of audio, images, hypertext, stored information and video.

13. The method as recited in claim 11, wherein the step of interpolating includes subdividing identified shots of the video into subshots using a motion analysis, the motion analysis including the steps of:
   estimating motion for the objects of interest by computing optical flow;
   observing the motion of the objects of interest;
   computing an error between the estimated motion and the observed motion; and
   if the error is above a threshold value, creating an extra node to further define the motion of the objects of interest.

14. The method as recited in claim 11, wherein the motion analysis includes an affine transform.

15. The method as recited in claim 11, wherein the step of interpolating includes the steps of:
   assigning object types to the objects of interest, the object types including vertices;
   interpolating corresponding vertices on object types between frames of shots of the video to define a spline such that the spline defines the motion of the objects of interest between the frames.

16. The method as recited in claim 11, further comprises the step of linking the objects of interest to other objects to provide an interactive video document which includes the step of providing automatic hyperlinking between the object of interest in the video and information represented in other media.

17. The method as recited in claim 16, wherein the automatic hyperlinking is provided by a hyperlinker and further comprises the step of providing link specifications processing, pattern matching, and link establishment between sources and destinations.

18. The method as recited in claim 11, further comprises the step of providing key frames for representing shots and subshots of the video data such that the key frame representation is used to identify the objects of interest included in the shots and subshots.

19. The method as recited in claim 11, wherein the video is specified in a video AIU specification language which follows Standard Generalized Markup Language (SGML) syntax and further comprising the step of defining syntax for the video specification.

20. A system for authoring and viewing videos comprising:
   a video editor for creating an anchorable information unit (AIU) file for objects of interest in a video;
   a video device for playing the video, the video having the anchorable information unit file associated therewith, the AIU file including object types associated with objects of interest within the video;
   a browser for interacting with the objects of interest to objects wherein playing the video and displaying the AIU file associated with the object types in the video provides interactive objects of interest for linking the objects of interest with other media upon selection of one the of the objects of interest and objects of the other media; and
   the video editor including means for interpolating vertices of the object types between frames to define motions of the objects of interest such that motions of the objects of interest are tracked during video play.

21. The system as recited in claim 20, wherein the other media includes one of audio, images, hypertext, stored information and video.

22. The system as recited in claim 20, wherein the means for interpolating further comprises a processor for subdividing identified shots of the video into subshots using a motion analysis, the processor including:
   means for estimating motion for the objects of interest by computing optical flow;
   means for observing the motion of the objects of interest;
   means for computing an error between the estimated motion and the observed motion; and
   if the error is above a threshold value, means for creating an extra node to further define the motion of the objects of interest.

23. The system as recited in claim 20, wherein the motion analysis includes an affine transform.

24. The system as recited in claim 20, wherein the means for interpolating further comprises:
   means for assigning object types to the objects of interest, the object types including vertices, the vertices between frames of shots of the video defining a spline such that the spline defines the motion of the objects of interest between the frames.

25. The system as recited in claim 20, further comprises an automatic hyperlinker for automatically hyperlinking the objects of interest in the video and related information in other media.

26. The system as recited in claim 25, wherein the automatic hyperlinker provides link specifications processing, pattern matching, and link establishment between sources and destinations.

27. The system as recited in claim 20, wherein the video device includes one of a disk player, a processor and a tape player.

28. The system as recited in claim 20, further includes an input device for selecting the objects of interest in the video.

29. The system as recited in claim 20, wherein the browser includes a processor.

30. The system as recited in claim 20, further comprises a key frame for representing each shot; and subshots are defined by boundary frames such that the shot and subshots are individually identifiable by the system.

31. The system as recited in claim 30, wherein the keyframes are employed for authoring video documents other than by viewing the entire video.

32. The system as recited in claim 20, wherein the video is specified in a video AIU specification language which follows Standard Generalized Markup Language (SGML) syntax.

* * * * *